Patented Dec. 5, 1922.

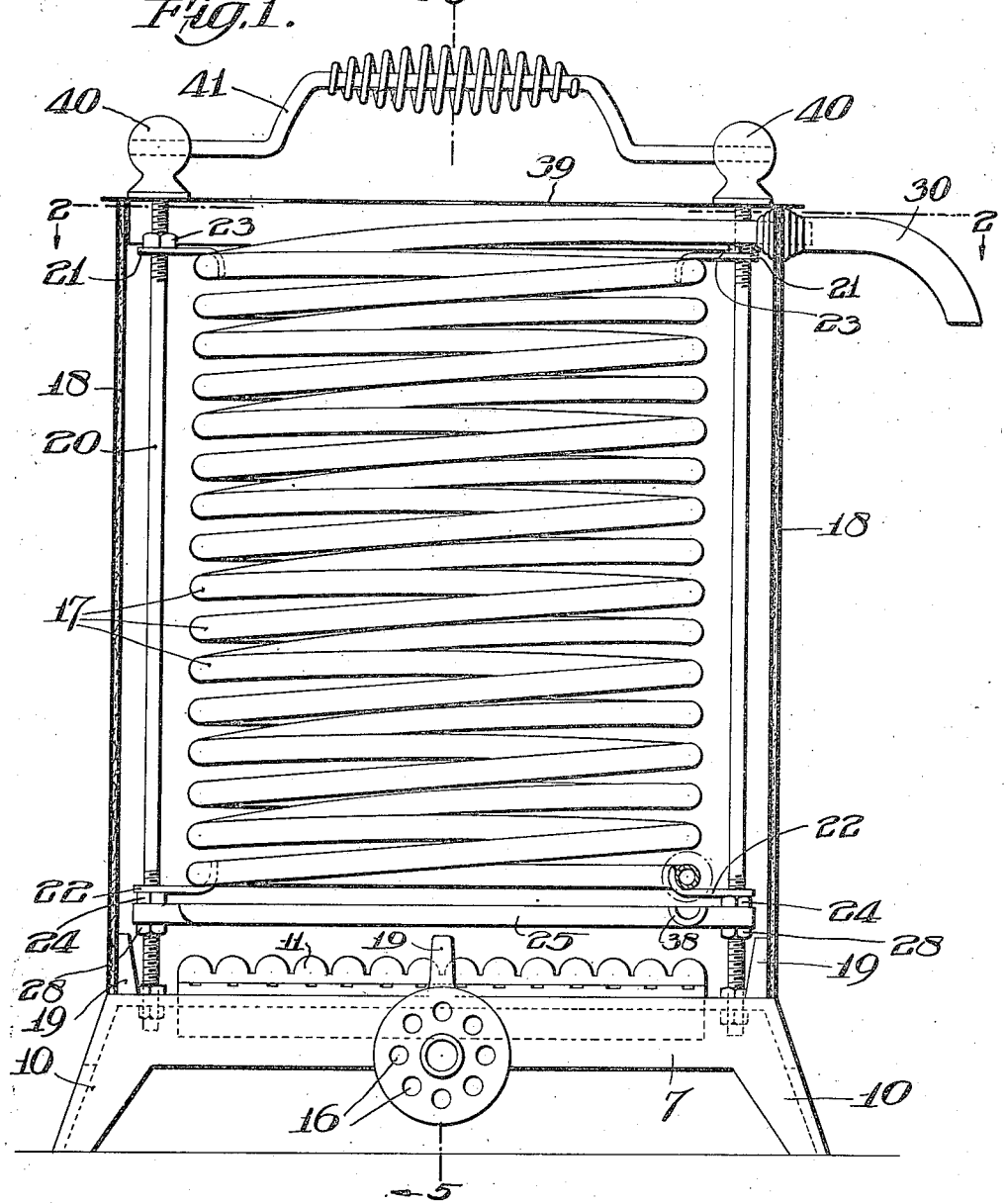

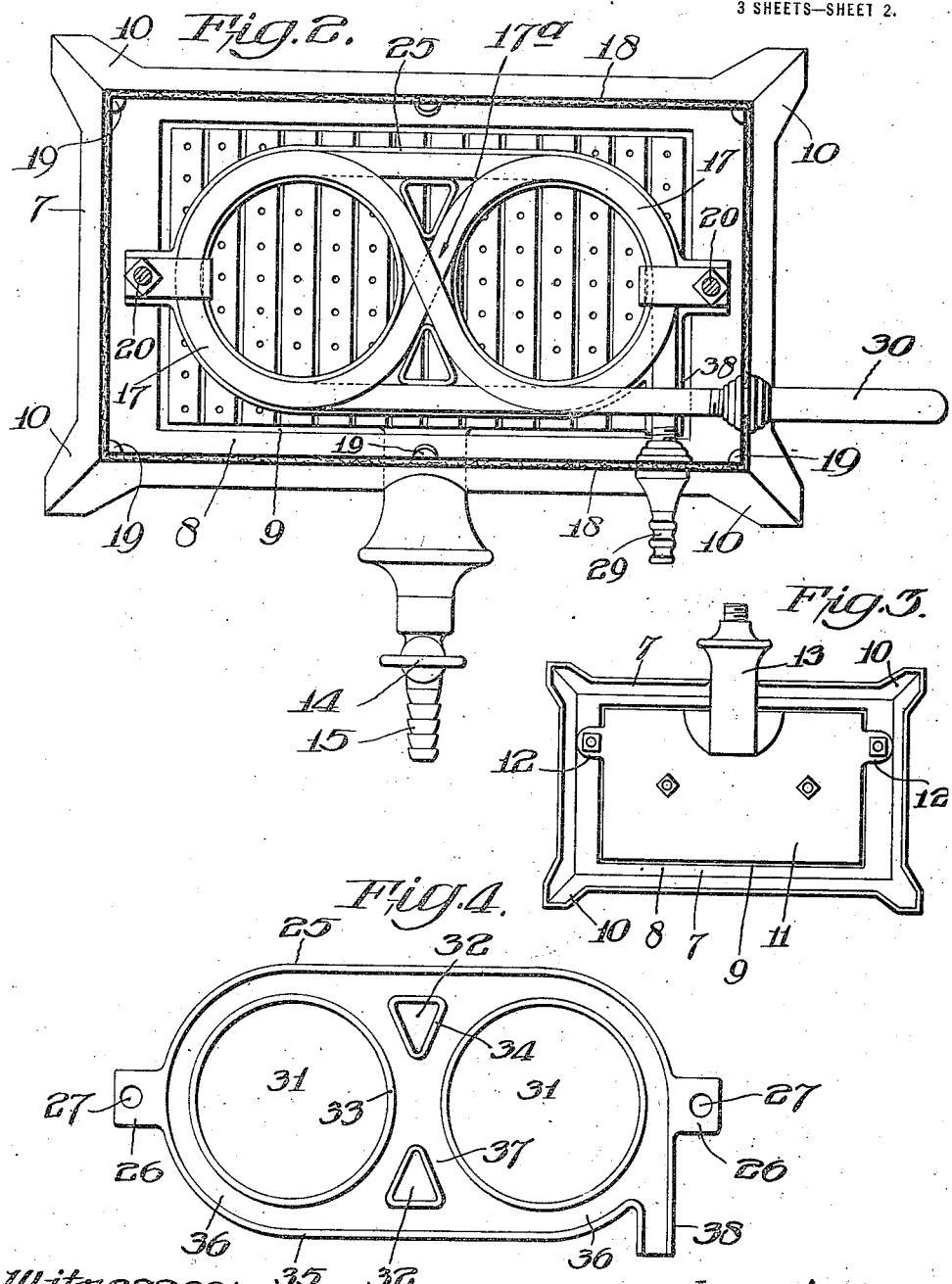

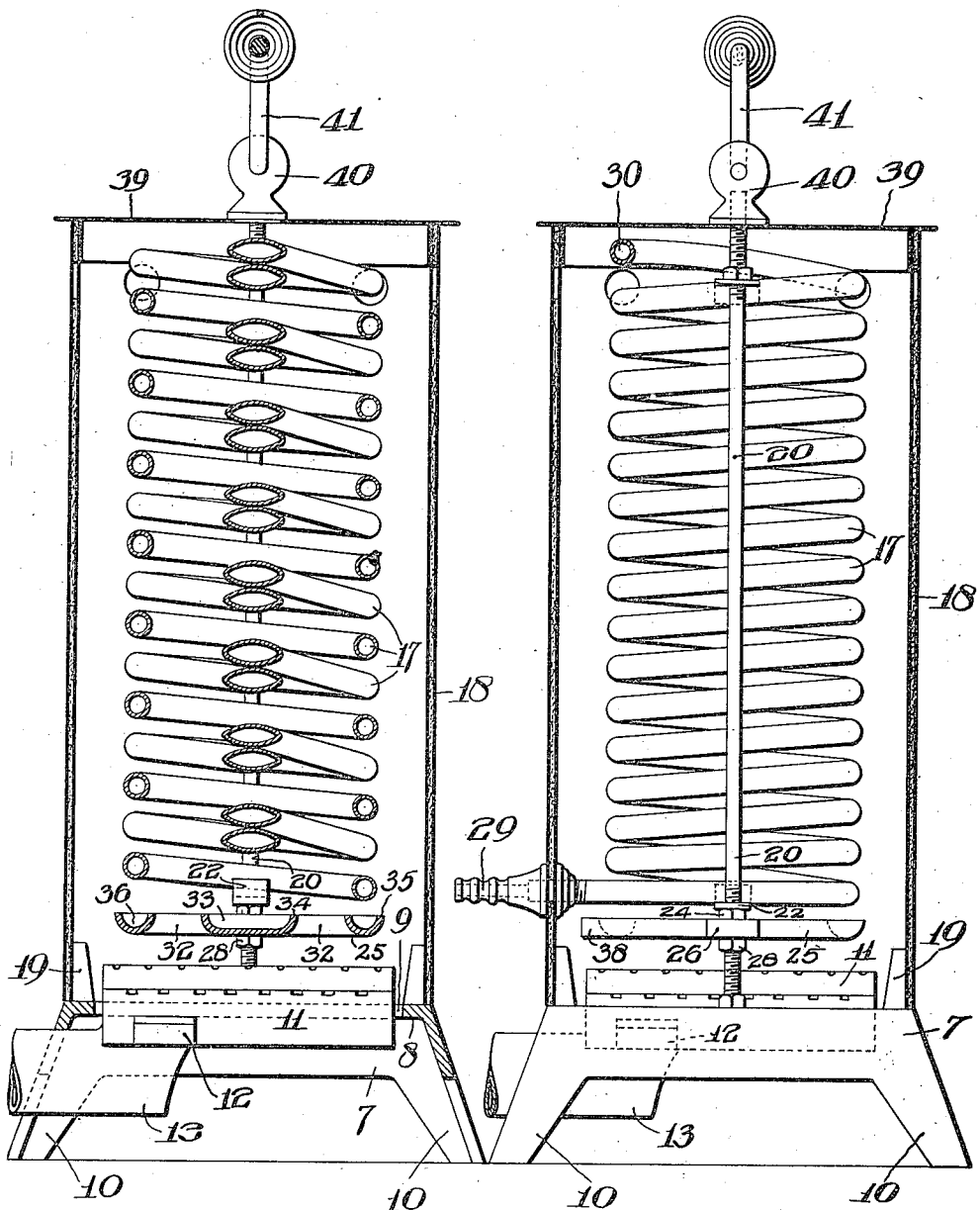

1,437,975

UNITED STATES PATENT OFFICE.

HARRY HOFFMAN AND THEODOR E. KREUTZER, OF PHILADELPHIA, PENNSYLVANIA; SAID HOFFMAN ASSIGNOR TO SAID KREUTZER.

WATER HEATER.

Application filed September 5, 1919. Serial No. 321,966.

*To all whom it may concern:*

Be it known that we, HARRY HOFFMAN, a citizen of the United States, and THEODOR E. KREUTZER, a citizen of Russia, residing at Philadelphia, county of Philadelphia, and State of Pennsylvania, have invented certain new and useful Improvements in Water Heaters, of which the following is a specification.

One object of our invention is to provide a portable water heater which will be of such construction that it can be attached to an ordinary house faucet by a hose or other suitable connection and will serve to quickly heat water. A heater constructed in accordance with our invention therefore can be conveniently used for heating water for a bath and can be connected with an ordinary gas supply jet.

Another object is to construct our invention so that the parts can be easily made and put together so as to provide a durable structure.

A still further object is to provide improved means for catching any external condensation drip from the water coil so as to prevent the drip from engaging the burner or other heating agent.

Another object is to so construct our improved drip catching means that it will permit the heat or products of combustion from the heating agent to engage the convolutions of the coiled water pipe.

A still further object is to so bend and shape the convolutions of our improved coiled water pipe that they will efficiently absorb the heat so as to quickly heat the water passing through a comparatively small number of the convolutions. For this reason our improved heater will heat water passing directly from a faucet through a coiled water pipe of comparatively small size; thereby keeping the heater within such weight that it can be easily carried by a person.

These objects, and other advantageous ends which will be described hereinafter, we attain in the following manner, reference being had to the accompanying drawings in which—

Figure 1 is a front elevation of our improved heater; the casing being shown in section, Figure 2 is a sectional plan view taken on the line 2—2 of Figure 1, Figure 3 is an inverted plan view of our improved heater drawn on a smaller scale than shown in Figures 1 and 2, Figure 4 is a top plan view of our improved drip receptacle, Figure 5 is a sectional elevation taken on the line 5—5 of Figure 1, and Figure 6 is an end elevation of our improved heater showing the casing in section.

Referring to the drawings, 7 is a base which is preferably made of cast metal and includes a top portion 8 with an opening 9. Legs 10 are provided on the base 7; said legs being spaced apart so as to permit air to pass between them and upwardly through the opening 9. A heating agent, such for example as a gas burner 11, is secured to the base. In the present instance the burner 11 has lugs 12 which are screwed to the top 8 and a gas and air inlet stem 13 extends from the body portion of the burner outwardly between two of the legs 10 and is provided with a valve 14 and gas pipe or hose connecting extension 15. The stem 13 is provided with apertures 16 to permit air to enter the stem and mix with the gas in the usual manner. A portion of the burner 11 extends upwardly through the opening 9 and the heat from the burner is adapted to heat a coiled water pipe 17 which is inclosed within a casing 18; said casing being mounted upon the base 7 outside of lugs 19 which project upwardly from the top of the base. Two rods 20 extend through and are secured to the top of the base 7; said rods having clips 21 and 22 thereon which hook into the top and bottom convolutions of the coil 17 as shown in Figures 1 and 2. The rods 20 have screw threaded portions upon which nuts 23 and 24 are mounted; said nuts being operative to move and hold the clips in clamping engagement with the top and bottom convolutions of the coil. In this manner the coil is firmly held within the casing.

A drip receptacle 25 has lugs 26 provided with holes 27 through which the rods 20 extend, said receptacle being mounted between the nuts 23 and other nuts 28 on said rods 20. The coiled water pipe has certain of its convolutions bent substantially 8-shape while other of its convolutions are bent in a substantially elliptical shape, such for example as shown in Figure 2. In the present form of our invention the 8-shape convolutions alternate with the elliptical convolutions. In this manner portions of the coil cross each other between the sides and ends of the coil as indicated at 17ª in Figure 2 so that the heat rising from the burner will be intercepted by the crossed portions of the coil convolutions and thereby cause the coil to absorb portions of the heat which would not be absorbed if the crossed portions were not present. In this manner we are able to secure the most value from the heat so as to quickly cause the heating of water passing through the coil.

The lower end of the coil projects outwardly through the casing 18 and is provided with a nipple 29 to which a hose or other suitable water conduit can be attached and the upper end of the coil is provided with a spout or spigot 30; said upper end also passing through the casing 18.

The drip receptacle 25 is so shaped as to catch any drip or liquid caused by the external condensation on the convolutions of the coil. As illustrated, this receptacle includes two large holes 31 and two intermediate holes 32. The holes 31 and 32 are bordered by flanges 33 and 34 and the outer portion of the receptacle has a flange 35. Thus a trough or gutter 36 is provided to catch the drip from the elliptical convolutions of the coil and a trough 37 at opposite sides of the flanges 34 is provided for the crossed portions of the S-shape convolutions of the coil. An extension 38 is provided on the receptacle 25; said extension forming an outlet for the gutters 36 and 37 and projecting such distance as to permit the drip water to drop therefrom at a position beyond the outer edge of the top of the burner 11 as shown in Figure 6 so that the top of the burner will be kept free from rust which would otherwise occur from the sweating of the coil.

The casing 18 has a top 39 through which the rods 20 extend and cap nuts 40 are screwed on the upper ends of the rods 20 and secure the top 39 in place. The cap nuts 40 provide bearings for the pivoted handle 41; said handle serving as means whereby the heater can be carried.

In the operation of our improved heater a gas pipe can be connected to the extension 15 and a hose from an ordinary house faucet or the like can be attached to the nipple 29 and as the water enters the bottom of the coil it passes upwardly therethrough and is heated and passes out through the spout 30. This spout is placed at such height that when the heater is set upon the floor alongside a bath tub, the spout can extend over the edge of the bath tub and the hot water will run into the bath tub just as fast as the supply water enters the heater.

While we have described our invention as taking a particular form, it will be understood that the various parts of our invention may be changed without departing from the spirit thereof, and hence we do not limit ourselves to the precise construction set forth, but consider that we are at liberty to make such changes and alterations as fairly come within the scope of the appended claims.

Having thus described our invention, what we claim as new and desire to secure by Letters Patent is:—

1. A portable water heater comprising a base and a burner supported therein in combination with a casing resting on said base, vertical tie rods connecting said base and the top of said casing, a coil arranged within said casing, clips on said rods adjacent their lower ends and supporting said coil, similar clips on said rods adjacent their upper ends and resting on the upper end of said coil and nuts threaded on said rods above the said last mentioned clips whereby the same may be clamped upon the coil, substantially as described.

2. A portable water heater comprising a base and a burner supported therein in combination with a casing resting on said base, vertical tie rods connecting said base and the top of said casing, a coil arranged within said casing, clips on said rods above and below said coil clamping the latter between them, and a drip plate supported on said rods below the lowermost clips, substantially as described.

In testimony whereof we have signed our names to this specification in the presence of two subscribing witnesses.

HARRY HOFFMAN.
THEODOR KREUTZER.

Witnesses:
 CHAS. E. POTTS,
 ANNA RENTON.